(12) United States Patent
Arant

(10) Patent No.: US 7,397,496 B2
(45) Date of Patent: Jul. 8, 2008

(54) APPARATUS SYSTEM FOR RECOVERING EVIDENCE OF EXTRINSIC WRONGFUL ACTS IN VEHICULAR INCIDENTS

(76) Inventor: Kenneth Eugene Arant, 1514 12th, Arcata, CA (US) 95521

( * ) Notice: Subject to any disclaimer, the term of this patent is extended or adjusted under 35 U.S.C. 154(b) by 767 days.

(21) Appl. No.: 10/886,739

(22) Filed: Jul. 9, 2004

(65) Prior Publication Data

US 2005/0231593 A1  Oct. 20, 2005

Related U.S. Application Data

(60) Provisional application No. 60/562,190, filed on Apr. 15, 2004.

(51) Int. Cl.
*H04N 7/18* (2006.01)

(52) U.S. Cl. .................... 348/148; 348/47

(58) Field of Classification Search ............. 348/148, 348/149, 118, 143, 135, 142, 154, 171, 552, 348/144, 145, 146, 147, 170, 47, 48, 37, 348/38, 39; 382/106, 107, 100, 103; 340/903, 340/907, 937, 435, 463; 386/32, 31, 100.1, 386/45, 108, 101; 702/142
See application file for complete search history.

(56) References Cited

U.S. PATENT DOCUMENTS

| | | | |
|---|---|---|---|
| 2,202,138 A | | 5/1940 | Buckham |
| 3,539,712 A | * | 11/1970 | Stephens, Jr. ............. 386/32 |
| 5,289,321 A | | 2/1994 | Secor |
| 5,497,419 A | * | 3/1996 | Hill ....................... 380/200 |
| 5,528,433 A | * | 6/1996 | Itoh et al. ................ 360/35.1 |
| 5,570,127 A | | 10/1996 | Schmidt |
| 5,586,063 A | * | 12/1996 | Hardin et al. ............ 702/142 |
| 5,646,614 A | | 7/1997 | Abersfelder et al. |
| 5,680,123 A | | 10/1997 | Lee |
| 5,942,746 A | * | 8/1999 | Tsai ....................... 250/208.1 |
| 6,151,065 A | | 11/2000 | Steed et al. |
| 6,333,759 B1 | | 12/2001 | Mazzilli |
| 6,411,874 B2 | * | 6/2002 | Morgan et al. ............. 701/36 |
| 6,583,730 B2 | | 6/2003 | Lang et al. |
| 6,738,088 B1 | | 5/2004 | Uskolovsky et al. |
| 6,738,089 B1 | | 5/2004 | Silc |
| 6,757,008 B1 | | 6/2004 | Smith |
| 6,812,831 B2 | | 11/2004 | Ikeda |
| 6,894,717 B2 | | 5/2005 | Bakewell |
| 6,940,423 B2 | | 9/2005 | Takagi et al. |
| 6,989,736 B2 | | 1/2006 | Berberich et al. |
| 6,990,397 B2 | | 1/2006 | Albou et al. |
| 7,046,171 B2 | | 5/2006 | Yanai |
| 7,116,803 B2 | | 10/2006 | Lemelson et al. |
| 7,126,460 B2 | | 10/2006 | Yamada |
| 7,227,611 B2 | | 6/2007 | Hull et al. |
| 2003/0085999 A1 | * | 5/2003 | Okamoto et al. ............ 348/148 |

(Continued)

FOREIGN PATENT DOCUMENTS

WO    WO 9937503 A1    7/1999

*Primary Examiner*—Tung Vo
*Assistant Examiner*—Behrooz Senfi
(74) *Attorney, Agent, or Firm*—Gene W. Arant

(57) ABSTRACT

A total perimeter view auto security monitoring system which includes a pair of fixed viewing lenses at each corner of a vehicle, a central digital camera receiving optical data from all corners of the vehicle, a multiplexer to separate the data channels in real time, and a hard disc drive for recording the data.

6 Claims, 2 Drawing Sheets

U.S. PATENT DOCUMENTS

Figure 1:
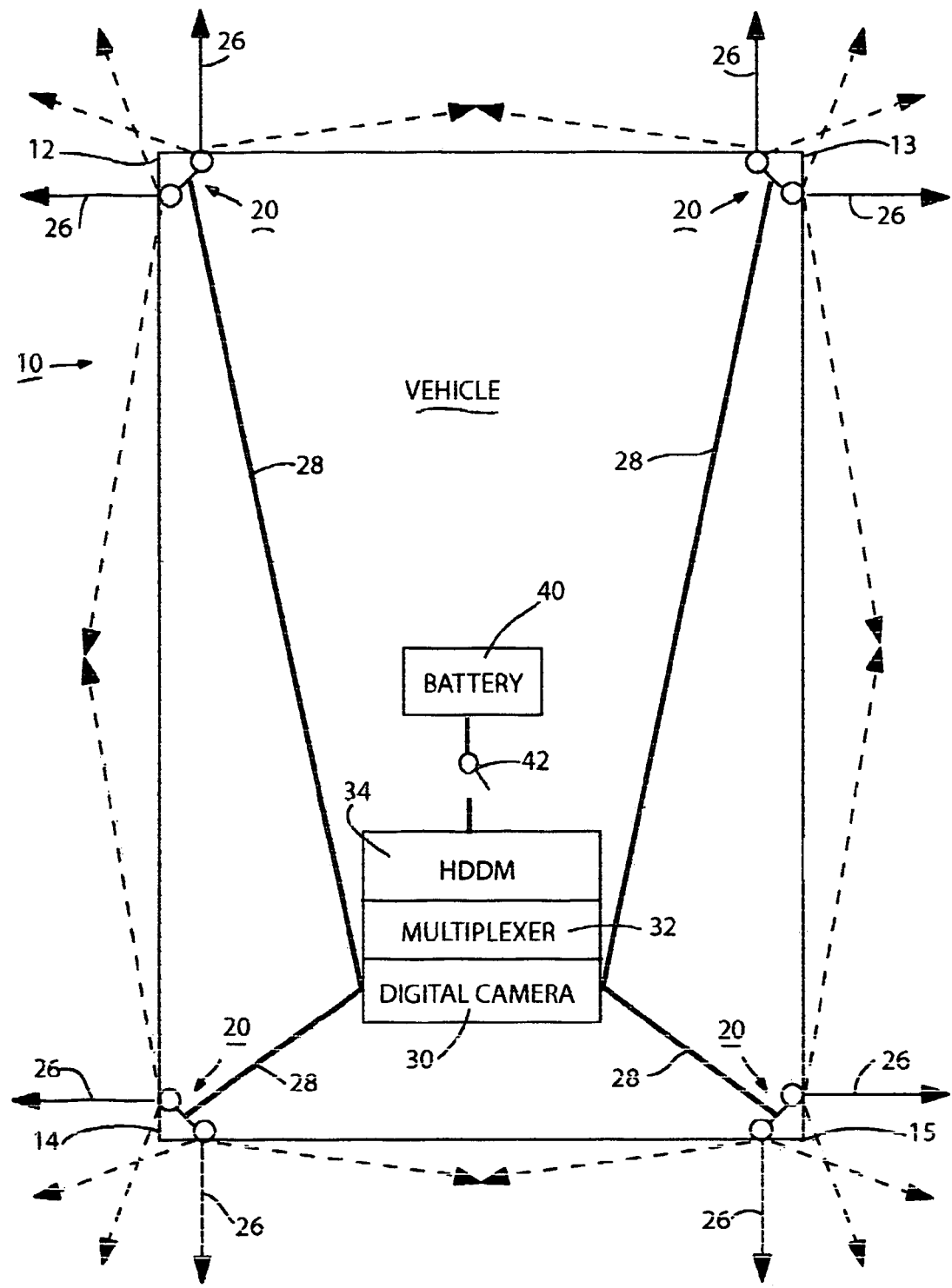

| | | |
|---|---|---|
| 2004/0141312 A1 | 7/2004 | Henning et al. |
| 2004/0169762 A1* | 9/2004 | Imoto .......................... 348/340 |
| 2004/0233285 A1* | 11/2004 | Seleznev et al. ............ 348/148 |
| 2005/0146607 A1* | 7/2005 | Linn et al. .................. 348/148 |
| 2005/0180149 A1 | 8/2005 | Albou et al. |
| 2005/0237385 A1 | 10/2005 | Kosaka et al. |

\* cited by examiner

APPARATUS SYSTEM FOR RECOVERING EVIDENCE OF EXTRINSIC WRONGFUL ACTS IN VEHICULAR INCIDENTS

PRIORITY CLAIM

This application claims priority of my copending U.S. Provisional Application Ser. No. 60/562,190 filed Apr. 15, 2004.

FIELD OF THE INVENTION

This invention relates to automobile security.

BACKGROUND OF THE INVENTION

There are many situations where an auto accident or auto crime has occurred and no reliable evidence is available as to what happened. Apparatus currently available to assist drivers while they are driving is of no value in recreating the action that took place at a time now past. Apparatus currently used in police work also has a very limited value and does not solve the problems.

SUMMARY OF THE INVENTION

According to the present invention I provide a system of recording optical information as to activity that took place around the entire perimeter of an automotive vehicle, not only when it is being driven or its engine is idling, but also when it is stopped and the engine is not running.

I therefore provide a perimeter monitoring system that records all visible activity around the entire perimeter of the vehicle, both when it is running and when it is parked.

My total perimeter view auto security monitoring system includes a separate set of digital camera apparatus fixedly mounted at each corner of the vehicle body, each being capable of viewing at least a quarter of a circle in a horizontal plane, so that all four sets of camera apparatus collectively provide a view of activity around the entire vehicle perimeter. Optical data (digital images) from all of the four corners of the vehicle are transmitted on a continuous and concurrent basis to a central digital recording medium to provide a complete record of the view about the perimeter. The optical data recorded in the digital recording medium can be conveniently retrieved after an accident or crime has occurred, to provide correct and reliable information. A source of electrical energy is provided to continuously energize not only the digital recording medium but also all four sets of the camera apparatus, whether or not the vehicle engine is running.

According to my invention the camera apparatus at each corner of the vehicle includes a pair of viewing lenses that are fixedly mounted in a common housing with their major viewing axes in generally perpendicular relation to each other to capture the optical data to be transmitted to the central recording medium.

According to the preferred form of my invention the viewing lenses in each corner housing have their major viewing axes separated by an angle of somewhat more than ninety degrees, in order to ensure coverage of the complete perimeter of the vehicle and also to provide some redundancy in the optical data.

DRAWING SUMMARY

Figure 2:
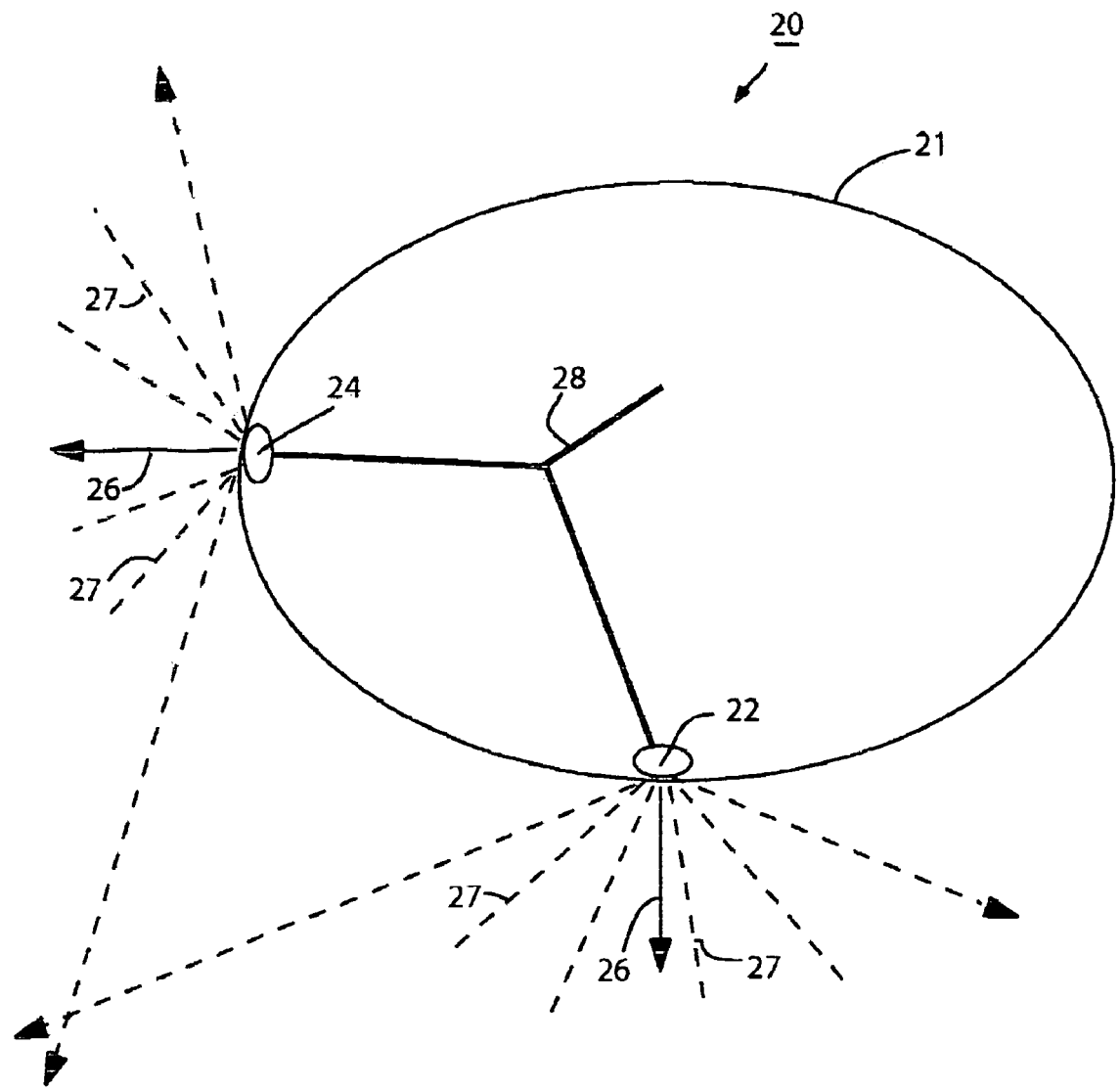

FIG. 1 is a schematic plan view of an automotive vehicle incorporating my system of apparatus; and FIG. 2 is a detail view showing the mounting of the viewing lenses in their fixed locations in each corner frame.

DETAILED DESCRIPTION OF PREFERRED EMBODIMENT

Reference is now made to the drawings which illustrate the presently preferred embodiment of my invention. An automotive vehicle 10 has four corners 12, 13, 14, 15. A corner camera apparatus 20 is mounted at each corner. Optical data from each corner camera apparatus 20 is fed to a digital camera 30, the output of which is sequentially divided by a time multiplexer 32 for recordation in a hard disc drive 34. Battery 40 energizes the corner camera apparati 20, digital camera 30, the multiplexer 32, and hard disc drive 34. Switch 42 is normally closed, both when the vehicle is running and when it is parked. Switch 42 will operate only under control of the user, and can survive a crash and still remain closed. The onboard disc drive memory 34 is removable.

Corner camera apparatus 20 includes a corner housing 21 which has a wall through which the perimeter of the vehicle may be viewed. The wall may be transparent, or specially constructed to survive a crash without damage to the interior contents of the housing 21.

A pair of viewing lenses 22, 24, are fixedly mounted within each housing 21 in generally perpendicular relation so as to cooperatively view at least about a quarter cirle of the perimeter of the vehicle. The major viewing axis of each lense is identified by an arrow 26, and arrows 27 indicate the viewing area about the major axis. The viewing areas 27 overlap to provide a desired redundancy not only between the two viewing areas for each corner camera apparatus, but also for the four corners of the vehicle. A duplex video cable 28 carries the optical data from the lenses 22, 24 to the digital camera 30.

The software system in the multiplexer preferably switches the camera output many times a second, while concurrently recording actual time. Separate tracks in the hard disc memory are preferably used to separately record the optical data gathered by each one of the lenses 22, 24 in a separate node file; in other words, eight separate tracks of real-time recorded data. The central digital recording medium includes a disc drive and a time multiplexing apparatus for sequentially switching the outputs of the four sets of digital camera apparsatus into the central digital recording medium.

Method of Operation. Thus according to my invention I provide a plurality of fixedly mounted optical viewing lenses around the entire periphery of the vehicle, to record all visible activity around its entire perimeter not only when it is being driven or its engine is idling, but also when it is stopped and the engine is not running. Optical data from all of the viewing lenses is transmitted on a continuous and concurrent basis to a central digital recording medium located in a secure location. A battery which cannot be disconnected except under control of the vehicle operator continuously energizes not only the digital recording medium but also all of the viewing lenses, whether or not the vehicle engine is running. The recording medium preferably includes a hard disc drive located in the trunk. When the vehicle is safely parked in the owner's garage the battery can be manually disconnected and the hard disc drive may be removed from the vehicle. Thus the optical data recorded in the digital recording medium can be conveniently retrieved after an accident or crime has occurred, to provide correct and reliable real-time optical information.

The presently preferred embodiment of my invention has been described in some detail in order to fully comply with the requirements of the patent law. The scope of my invention, however, is to be judged only in accordance with the appended claims.

PARTS LIST

10 Automotive vehicle
12, 13, 14, 15 Vehicle corners
20 corner camera apparatus
21 corner housing
22, 24 viewing lense
26 major axis of view
27 viewing area
28 video cable
30 digital camera
32 multiplexer
34 hard disc drive
40 battery
42 switch

What I claim is:

1. A system for recording optically viewablie conditions or activities around the entire perimeter of an automotive vehicle, comprising, in combination:

(a) a vehicle body having front and rear corners;
   (b) four sets of digital camera apparatus, each being fixedly mounted with respect to a corresponding corner of the vehicle body;
   (c) each set of camera apparatus including a pair of viewing lenses that are fixedly mounted with their major viewing axes in a horizontal plane in generally perpendicular relation to each other, and being capable of viewing objects that are visible from the corresponding vehicle corner within at least about a quarter of a circle such that the collective viewing areas of all of the sets of camera apparatus will provide redundant views of conditions and activity around the entire perimeter of the vehicle;
   (d) a central digital recording medium, including a hard disc drive having a plurality of separate tracks, to provide a complete record of the views about the perimeter of the vehicle;
   (e) a digital camera for receiving optical data from said four sets of corner camera apparati;
   (f) cable means for feeding the optical data from all of the eight viewing lenses of said four sets of digital camera apparati to said digital camera on a continuous and concurrent basis;
   (g) a time multiplexer cooperatively associated with the cable means and the digital camera for sequentially dividing the outputs from the camera apparati for recordation into separate tracks of the hard disc drive; and
   (h) wherein the digital recording medium in conjunction with the time multiplexer is operable to record the outputs of the eight viewing lenses in separate node files on separate tracks of the hard disc.

2. Apparatus as in claim 1 wherein the vehicle body has at each corner a corner housing with a transparent wall through which the surroundings of the vehicle may be viewed, and the pair of lenses for each corner camera apparatus are positioned within the associated housing.

3. Apparatus as in claim 1 wherein the viewing lenses in each corner camera apparatus have their major viewing axes separated by an angle of somewhat more than ninety degrees.

4. Apparatus as in claim 1 wherein the multiplexer while switching the camera input also records actual time.

5. Apparatus as in claim 1 which includes a battery that continuously energizes not only the digital recording medium but also all of the viewing lenses, whether or not the vehicle engine is running, and which cannot be disconnected except under control of the vehicle operator.

6. The apparatus of claim 1 wherein the vehicle has a vehicle battery and a trunk, the disc drive is supported within the trunk, the battery has a switch for energizing the digital camera apparatus, multiplexer, and hard disc drive, the switch is normally closed, both when the vehicle is running and when it is parked, and the switch is operable only under control of the driver of the vehicle.

\* \* \* \* \*